(12) United States Patent
Gounares et al.

(10) Patent No.: US 8,966,462 B2
(45) Date of Patent: Feb. 24, 2015

(54) MEMORY MANAGEMENT PARAMETERS DERIVED FROM SYSTEM MODELING

(75) Inventors: Alexander G. Gounares, Kirkland, WA (US); Ying Li, Bellevue, WA (US); Charles D. Garrett, Woodinville, WA (US)

(73) Assignee: Concurix Corporation, Kirkland, WA (US)

( * ) Notice: Subject to any disclaimer, the term of this patent is extended or adjusted under 35 U.S.C. 154(b) by 107 days.

(21) Appl. No.: 13/571,599

(22) Filed: Aug. 10, 2012

(65) Prior Publication Data

US 2013/0081005 A1    Mar. 28, 2013

(51) Int. Cl.
  G06F 9/45     (2006.01)
  G06F 12/00    (2006.01)
  G06F 13/00    (2006.01)
  G06F 11/34    (2006.01)
  G06F 9/50     (2006.01)
  G06F 9/455    (2006.01)

(52) U.S. Cl.
  CPC .......... G06F 11/3409 (2013.01); G06F 9/5016 (2013.01); G06F 11/3447 (2013.01); G06F 2209/508 (2013.01); G06F 9/4552 (2013.01); G06F 2201/865 (2013.01)
  USPC ............ 717/148; 717/140; 707/813; 711/103

(58) Field of Classification Search
  None
  See application file for complete search history.

(56) References Cited

U.S. PATENT DOCUMENTS

| 7,076,511 | B1 | 7/2006 | Lari et al. | |
| 7,356,817 | B1 | 4/2008 | Cota-Robles et al. | |
| 7,596,683 | B2 | 9/2009 | Morrow | |
| 7,734,676 | B2 | 6/2010 | Dritschler et al. | |
| 8,001,538 | B2 * | 8/2011 | Gray et al. | 717/141 |
| 8,146,053 | B2 | 3/2012 | Morrow et al. | |
| 8,225,297 | B2 * | 7/2012 | Gray et al. | 717/141 |
| 8,607,018 | B2 * | 12/2013 | Gounares et al. | 711/170 |
| 2002/0138506 | A1 * | 9/2002 | Shuf et al. | 707/206 |
| 2003/0225917 | A1 | 12/2003 | Partamian et al. | |
| 2004/0177245 | A1 | 9/2004 | Murphy | |

(Continued)

OTHER PUBLICATIONS

Yefim Shuf, Manish Gupta, Rajesh BordawekarJaswinder Pal Singh, "Exploiting Prolific Types for Memory Management and Optimizations", Jan. 2002, ACM ISBN 1-58113-450-9/02/01, p. 1-12. Link: www.cs.purdue.edu/homes/hosking/.../p295-shuf.pd.*

(Continued)

Primary Examiner — Don Wong
Assistant Examiner — Mohammad Kabir
(74) Attorney, Agent, or Firm — Æ ON Law; Adam L. K. Philipp

(57) ABSTRACT

Optimized memory management settings may be derived from a mathematical model of an execution environment. The settings may be optimized for each application or workload, and the settings may be implemented per application, per process, or with other granularity. The settings may be determined after an initial run of a workload, which may observe and characterize the execution. The workload may be executed a second time using the optimized settings. The settings may be stored as tags for the executable code, which may be in the form of a metadata file or as tags embedded in the source code, intermediate code, or executable code. The settings may change the performance of memory management operations in both interpreted and compiled environments. The memory management operations may include memory allocation, garbage collection, and other related functions.

19 Claims, 8 Drawing Sheets

(56) References Cited

U.S. PATENT DOCUMENTS

| | | |
|---|---|---|
| 2004/0194073 A1* | 9/2004 | Chan et al. ............ 717/151 |
| 2005/0177836 A1 | 8/2005 | Lari et al. |
| 2006/0101434 A1* | 5/2006 | Lake et al. ............ 717/140 |
| 2006/0195715 A1 | 8/2006 | Herington |
| 2006/0271827 A1 | 11/2006 | Cascaval et al. |
| 2007/0006188 A1* | 1/2007 | Schroth et al. ............ 717/140 |
| 2007/0088716 A1 | 4/2007 | Brumme et al. |
| 2007/0174410 A1 | 7/2007 | Croft et al. |
| 2007/0226698 A1 | 9/2007 | Cascaval et al. |
| 2007/0245309 A1* | 10/2007 | Gray et al. ............ 717/115 |
| 2008/0034367 A1 | 2/2008 | Patrick et al. |
| 2008/0082968 A1 | 4/2008 | Chang et al. |
| 2008/0155550 A1 | 6/2008 | Tsafrir et al. |
| 2008/0295113 A1 | 11/2008 | Breitgand et al. |
| 2009/0037879 A1 | 2/2009 | Iyengar et al. |
| 2009/0100435 A1 | 4/2009 | Papaefstathiou et al. |
| 2009/0271763 A1* | 10/2009 | Varma et al. ............ 717/114 |
| 2009/0271799 A1 | 10/2009 | Barsness et al. |
| 2010/0064035 A1 | 3/2010 | Branca et al. |
| 2010/0082322 A1* | 4/2010 | Cherkasova et al. ............ 703/22 |
| 2010/0162257 A1 | 6/2010 | Hiltunen et al. |
| 2010/0199130 A1 | 8/2010 | Rolia et al. |
| 2011/0022812 A1 | 1/2011 | Van Der et al. |
| 2011/0087387 A1 | 4/2011 | Safa-Bakhsh et al. |
| 2011/0107341 A1 | 5/2011 | Longobardi et al. |
| 2011/0179424 A1 | 7/2011 | Saxe et al. |
| 2012/0198375 A1 | 8/2012 | Carter et al. |
| 2012/0233609 A1 | 9/2012 | Blythe et al. |
| 2013/0080641 A1 | 3/2013 | Lui et al. |

OTHER PUBLICATIONS

International Search Authority, International Search Report and Written Opinion, Korean Intellectual Property Office, PCT/US2013/036968, Jun. 4, 2013.

International Search Authority, Korean Intellectual Property Office, International Search Report and Written Opinion, PCT/US2013/037341, Jun. 3, 2013.

Quintero et al, "Power Systems enterprise Servers with PowerVM Virtualization and RAS", Redbooks, Dec. 2011, 424 pg.

International Searching Authority, Korean Intellectual Property Office, International Search Report and Written Opinion PCT/US2013/037523, Jul. 31, 2013.

* cited by examiner

MEMORY MANAGEMENT PARAMETERS DERIVED FROM SYSTEM MODELING

BACKGROUND

Many computer platforms use an execution environment to run workloads. An execution environment may be an operating system, or other software construct that provides an interface between hardware and software in many computing systems. An operating system may manage various hardware resources and provide a common interface for a software workload, which may be an application. A virtual machine may be a software construct that may provide an interface between an operating system, hypervisor, or other software component and the software workload.

Some virtual machines may operate as a full replication of a hardware platform such that a complete operating system may be executed within a virtual machine. In other cases, a virtual machine may be an execution environment that may manage execution of one or more applications. Such virtual machines may be known as process virtual machines or application virtual machines. In such a case, the virtual machine may provide some functions that conventional operating systems may provide, such as memory management, compute management, and input/output management.

In many cases, application programs call routines in an execution environment to access memory, peripheral devices, storage devices, network connections, input/output devices, and other resources. The execution environment may perform various low level management of resources so that an application programmer may not have to deal with the details of interfacing with the various resources.

Conventional execution environments may be designed for general purpose use, where the execution environment may support many different types of applications. Some applications may be computationally intensive, while other applications may consume and produce data from one of the various peripheral devices. Each type of application may use the resources in a different manner, yet because a conventional execution environment may support any type of application, the design and configuration of the execution environment may be generic. Such an execution environment may not be optimized for any one type of application.

Some execution environments may be tunable to some extent. A tunable execution environment may be configured in a customized manner, then compiled to create a customized execution environment. In addition, some execution environments may have parameters that can be changed to vary some aspects of the execution environment performance.

SUMMARY

Optimized memory management settings may be derived from a mathematical model of an execution environment. The settings may be optimized for each application or workload, and the settings may be implemented per application, per process, or with other granularity. The settings may be determined after an initial run of a workload, which may observe and characterize the execution. The workload may be executed a second time using the optimized settings. The settings may be stored as tags for the executable code, which may be in the form of a metadata file or as tags embedded in the source code, intermediate code, or executable code. The settings may change the performance of memory management operations in both interpreted and compiled environments. The memory management operations may include memory allocation, garbage collection, and other related functions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
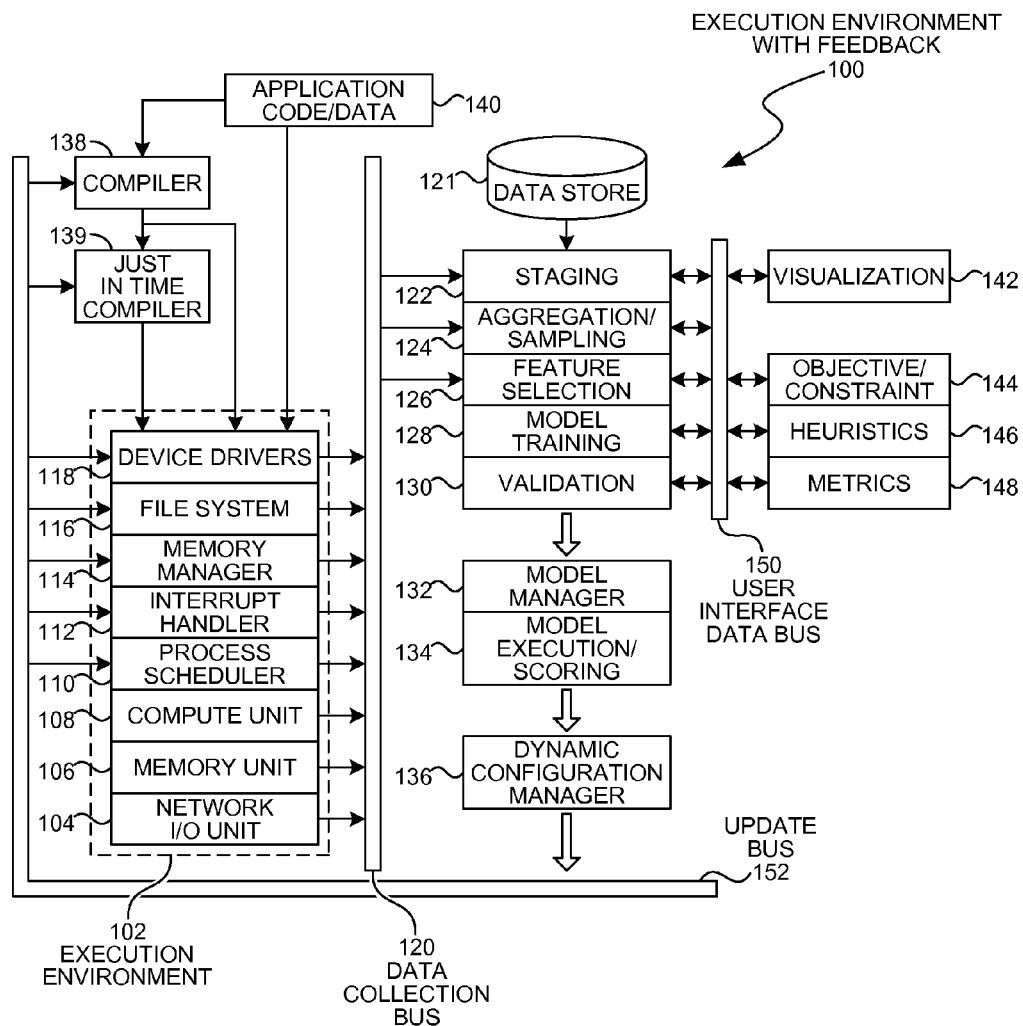
FIG. 1 is a diagram illustration of an embodiment showing an execution environment with feedback.

An execution environment may be managed and optimized by collecting performance and other observations, generating a mathematical model of the operations to determine an optimized configuration, then implementing the optimized configuration in the execution environment. Such an execution environment may be optimized while executing various workloads, so that the overall system may be tuned to optimally execute a given workload.

The execution environment may be instrumented or profiled to collect data regarding its operations. The instrumentation that may include data collection mechanisms that retrieve and transmit performance data. Profiling may also include routines that monitor execution environment actions and develop data or statistics regarding observations. The profiling may observe events in the execution environment, trace execution, or provide other information about the dynamic operations of an execution environment in response to a workload.

A data collection system may gather observations regarding memory operations, computation operations, network and other input/output operations, and other hardware activities. The data may also include data from execution environment operations, such as process scheduling, memory allocations, interrupt handling, file system operations, device drivers, and other software operations.

The data may be analyzed by creating a mathematical model of the execution environment and optimizing using the model. The mathematical model may be a regression model, neural network, or other representation of the execution environment. In some embodiments, multiple models may be used.

The modeling may be a representation of the system behavior. In some embodiments, the system behavior may refer to the execution environment behavior in response to workload stimulus. In other embodiments, the system behavior may include an execution environment and its workloads in response to various input/output stimuli.

After the modeling has been completed, an optimization analysis may attempt to identify an optimized configuration for the execution environment, based on desired performance metrics. The optimized configuration may include different configuration parameters for the execution environment as well as updated or customized executable modules that may be deployed as part of the execution environment.

Garbage collection is one aspect of memory management in many execution environments. Garbage collection may refer to mechanisms by which previously used memory locations may be reclaimed and used again. Many programming paradigms allow a programmer to create objects that consume memory, but once the objects are no longer used, a garbage collector may free up the memory location and reuse the memory for other objects.

Garbage collection may be an overhead operation that may affect the performance of an application. When garbage collection is efficient, an application utilize the least amount of memory without suffering much processing delay. Garbage collection that is inefficient may cause substantial processing delay or may use large amounts of memory that may otherwise be used by other applications.

Memory allocation is another aspect of memory management provided by many execution environments. Memory allocation may refer to how memory may be provisioned to processes that may request memory access. Some embodiments may have sophisticated heuristics and algorithms to allocate memory, and such heuristics and algorithms may have various parameters that may affect how memory may be allocated.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing an execution environment with a feedback mechanism. Data may be collected from the execution environment, analyzed, and changes made to the execution environment to change the performance characteristics of the execution environment. Many data collection, data modeling, and data mining techniques may be applied to the execution environment, then changes may be made to the execution environment to increase performance.

The system of embodiment 100 illustrates an execution environment that has various control points. The control points may be any portion of the execution environment that may be changed. The ways an execution environment may be changed may vary on the specific execution environment, but the ways may include configuration parameter changes and module replacement.

Configuration parameters may be values that are referenced during the execution of the execution environment. By changing these values, the execution environment functionality may be changed. For example, a configuration parameter may be defined for the time window allocated for process scheduling. By changing the parameter value in a configuration file, a process scheduler may be allocated a bigger or smaller time window.

In some cases, a configuration parameter may cause the executable code within the execution environment to branch one way or another. For example, a configuration parameter may be created that causes a memory allocator to allocate memory using a first method or a second method. Depending on the setting of the parameter, the memory allocator may operate using completely different portions of existing executable code.

Module replacement may be a mechanism by which modules may be added and removed from an execution environment. Some execution environments may allow executable code to be added or removed from the execution environment while the execution environment executes. In some cases, the executable code may be items such as drivers or interfaces to new components. In other cases, the executable code may be any portion of the execution environment code. By using both the adding and removal functions, existing modules may be replaced. Some programming paradigms may support such changes while other paradigms may not.

In general, the execution environment may be controllable or configurable in many different manners. In many embodiments, an execution environment or portions of an execution environment may be heavily parameterized so that the functionality of the execution environment may be changed on the fly.

The changes made to the execution environment may allow the execution environment to adapt to the workloads being executed on the system. The workloads may be various applications, and each application or group of applications may have different demands on the execution environment. For example, some applications may be compute intensive, while other applications may be input/output intensive. In each case, the execution environment may be configured differently to maximize performance of the system.

Data may be collected from the execution environment as it executes. Profiling the execution environment and its various components may collect data that reflect the system behavior while executing a particular workload. In some embodiments, the workload may be profiled in addition to the execution environment.

The data may be any observed data about the execution environment behavior. In some cases, the raw data may be aggregated, summarized, synthesized, or otherwise processed prior to analysis. The collected data may be performance related parameters, as well as current configuration settings or other input parameters. In many cases, large amounts of raw data may be collected, then analyzed to identify those parameters that may be related to desired performance metrics.

The data may be collected and stored using various mechanisms, including real time and delayed mechanisms. Real time mechanisms may transmit data at or near the time that the data are collected. In such cases, a database may tag and store the data for processing. The data may be tagged with various metadata, such as timestamps, data source, current configuration parameters, or other metadata.

A delayed data collection mechanism may read data from a log file or other short term storage mechanism, then collect the data for processing at a later time. In such mechanisms, the data may be timestamped or otherwise tagged for correlation with other data collected using similar or different data collection mechanisms.

Once the data are collected, mathematical models may be constructed to represent the data. Prior to modeling, the data may be aggregated, sampled, or otherwise consolidated. In some cases, summary statistics may be created from the data, and the summary statistics may identify one or more features that may relate to a performance metric, an input parameter, or meaningful characterization of some aspect of the execution environment.

The execution environment may be modeled to mathematically represent the performance of an execution environment and its workload. The model may have inputs representing the data collected as well as the configuration parameters of the execution environment, and the model may have outputs representing the performance data. The model may be any type of model, including neural networks, regression models, or other mathematical models. In some cases, multiple mathematical models may be created, tested, and scored.

Some models may be dynamic models that may learn or change as new data are collected. In other cases, the models may be developed using data collected, then the models may be deployed as static models that may be used for optimization purposes.

The models may be analyzed to determine an optimized or improved configuration of the execution environment. The optimized configuration may be transmitted back to the execution environment and implemented. The changes to the execution environment may be tracked to determine whether or not the changes improved performance.

The notion of 'performance' of the execution environment may mean any type of metric for which the execution environment and its workload may be optimized. In some cases, the metric may be a speed or quality of service metric, such as lower response time or processing throughput. In other cases, the metric may be power consumption, efficiency, hardware utilization, or other metric. In some embodiments, an optimized performance may be a combination of factors, such as maximizing throughput while minimizing power consumption. The system may allow a system administrator, developer, or other human input to select and define optimization metrics.

An execution environment 102 is illustrated as having several components. The execution environment 102 may be any operating system, including LINUX or UNIX variations, Windows-based operating system, Macintosh-based operating system, and other operating system. The execution environment 102 may also be a process virtual machine, such as JavaVM, .NET Framework, Erlang virtual machine, Turing machine, Inferno, DotGNU, Portable.NET, JikesRVM, LLVM, Mono, Parrot virtual machine, Dalvik virtual machine, libJIT virtual machine, Squeak virtual machine, or others. Such process virtual machines may be a stack model or register model virtual machine with automatic or manual memory management.

The execution environment 102 may have several hardware monitoring components, including a network input/output unit 104, a memory unit 106, and a compute unit 108. The hardware monitoring components may collect data from various hardware elements and pass the data to a data collection mechanism, which may be represented as a data collection bus 120.

The various hardware monitoring components may be able to measure hardware activities directly or indirectly. In the case of a virtual machine execution environment, the hardware monitoring components may be able to monitor hardware calls indirectly or directly when an application programming interface may be present that enables direct measurement. In the case of an operating system execution environment that operates natively on a hardware platform, the hardware monitoring components may be able to measure some hardware activities directly.

A direct measurement may mean that a monitoring agent within the execution environment may communicate with the hardware components and directly measure hardware activities. Indirect measurement may mean that interaction with the hardware may be measured through function calls or other interaction with hardware components. In some cases, measurements may be inferred or calculated from other observations.

The network input/output unit 104 may monitor traffic into and out of the computer system, through a network interface, peripheral device, or other communications mechanism. The monitoring operations may collect data relating to performance, such as throughput, processing latency, errors or faults, and other factors. The monitoring operations may also characterize the traffic, such as defining packet size, transmission frequency, data content, or other characterizations.

The memory unit 106 may monitor how memory is used, including how memory objects are allocated, where various memory objects are located, how frequently the objects may be accessed, any errors or faults associated with memory operations, or other data.

The compute unit 108 may monitor the operations of computer processors. Such monitoring may include efficiency and throughput data, utilization data, error and fault data, and other information.

The execution environment 102 may have several software components, such as a process scheduler 110, an interrupt handler 112, a memory manager 114, a file system 116, and various device drivers 118.

The process scheduler 110 may be a low level function that may schedule work on various processors. In some cases, each processor in a multi-processor system may have its own process scheduler. In other cases, groups of processors may be share a single process scheduler. In general, a process scheduler may select which jobs, threads, or other executable code may be executed by a processor. In some cases, the process scheduler may also control the processing of hardware functions, such as attached devices.

The process scheduler 110 may have various parameters and adjustments that may be made during execution. For example, the process scheduler may select between several different algorithms to select which code to execute. The various algorithms may use different criteria for setting priorities for execution, for example.

Some or all of the process scheduler algorithms may have different parameters that may change how the algorithms operate. For example, a parameter may define the length of time each executable code may be allowed to run, or another parameter may identify the maximum number of processes that may be executed simultaneously on a certain processor.

The process scheduler 110 may be instrumented and profiled to collect performance and other data. The data may include, for example, the amount of time devoted to overhead administrative processes verses workload processes, any idle or wait time, the number of processes executed simultaneously, the swap time associated with switching processes, and other data.

An interrupt handler 112 may be an execution environment component that may receive and process hardware and software interrupts. An interrupt may be generated by peripheral devices. The peripheral devices may be network interface cards, storage devices, input/output devices, or other hardware. In some cases, processors, memory, or other hardware may generate interrupts.

In general, an interrupt may cause a change in the executing code. For example, a packet may be received by a network interface card, which may generate an interrupt. The interrupt may be processed by the interrupt handler 112 to start or resume execution of code that may process the incoming packet. After processing the incoming packet, the code may revert to a sleep mode until another interrupt is received.

The interrupt handler 112 may be instrumented to collect data. For example, the data may include the number and types of interrupts, the response time and success rate in responding to each interrupt, as well as other data. In some cases, the data may be collected for specific types of interrupts, while in other cases, the data may be collected across all interrupts.

The interrupt handler 112 may be parameterized so that the operational aspects may be changed. For example, the interrupt handler may select between several different algorithms to process certain interrupts in different manners.

Some or all of the interrupt handler algorithms may have different parameters that may change how the algorithms operate. For example, a parameter may define the length of time between receiving a specific interrupt to when the interrupt may be serviced.

A memory manager 114 may allocate memory to various processes, swap objects in and out of main memory or cached memory, perform garbage collection, and other memory related functions. The memory manager 114 may be parameterized to change the way memory is managed, including changing algorithms and parameters associated with those algorithms. The memory manager 114 may also be instrumented or profiled to collect memory related data.

A file system 116 may manage files or other storage objects. The file system 116 may be profiled or instrumented to collect performance data, as well as may be parameterized to allow changes between different algorithms and parameters related to the various algorithms.

The device drivers 118 may be a software interface between a peripheral device or other resource and applications running on the execution environment. The device drivers 118 may be profiled or instrumented to monitor the drivers. In some cases, the device drivers 118 may be parameterized so that changes may be made to the operations of the drivers.

The output of the various instrumentation and profiling mechanisms in the execution environment may be collected on a data collection bus 120. The data collection bus 120 may gather data using various mechanisms so that the data may be analyzed. In some cases, the data collection bus 120 may pull data from various data sources, while in other cases, the data sources may push data to the data collection bus 120. In some cases, the data may be collected at or near real time, while in other cases the data may be collected on a delayed basis by collecting log files or other temporary data collection mechanisms. In still other cases, the data may be collected in one location, then moved to another location for later processing.

The data collection bus 120 may store the collected data in a data store 121. The data store 121 may collect data from one device or from multiple devices. In some embodiments, the collected data may be processed in real time, while in other embodiments, the data from the data store 121 may be analyzed offline to create and validate models, among other uses.

An aggregation or sampling system 124 may perform a first level processing of the data. In cases where large amounts of data are present, the data may be summarized, categorized, or sampled to reduce the number of data points for analysis.

A feature selection system 126 may automatically determine which data elements, summary statistics, or other features may be modeled. In some cases, the feature selection system 126 may operate and iterate with human input or assistance. For example, a human expert may select specific summary statistics that may be known to be relevant to a model. The human may also create various heuristics, constraints, metrics, or other expressions that may be used in modeling the execution environment. The feature selection system 126 may provided automatically generated suggestions that may be selected and approved by a human expert.

The model training 128 and validation 130 systems may create a mathematical model of the execution environment. The mathematical model may express the inputs and outputs of the execution environment in a manner that can be used to optimize a desired output.

The mathematical model may be any of a wide variety of models, such as linear, nonlinear, deterministic, stochastic, static, dynamic, discrete, continuous, deductive, inductive, or any other type of mathematical model.

The validation system 130 may test the mathematical model against incoming data or against historical data to verify the accuracy and predictability of the model.

In some embodiments, the operations of the systems for staging, aggregation, feature selection, model training, and validation may be performed on the same device as the execution environment 102. In other embodiments, one or more of the same operations may be performed by another device, such as a server that may communicate with the execution environment 102 over a network connection.

A model manager 132 may select between multiple models and use model that may be appropriate in a particular situation. A model execution and scoring system 134 may analyze output of a model to identify optimized settings for the execution environment 102 given the current performance. A dynamic configuration manager 136 may cause the optimized settings to be implemented. The optimized settings may be deployed through an update bus 152. The update bus 152 may be any mechanism that may implement changes in the execution environment 102.

A visualization system 142 may be a user interface through which an administrator may monitor performance and affect changes to the execution environment 102. The visualization system 142 may communicate with other components using a user interface data bus 150. The user interface data bus 150 may be a mechanism and protocol through which data may be collected for displayed, as well as to receive input from a user that may be implemented by different components.

The user interface bus 150 may communicate with the systems for staging 122, aggregation and sampling 124, feature selection 126, model training 128, and validation 130. A user may be able to update or change various objectives and constraints 144, heuristics 146, and metrics 148.

Embodiment 100 illustrates a mechanism whereby an execution environment may be optimized and configured for a current workload. In many cases, different applications 140 may use a computer's resources differently. Some applications may be computationally intensive, while other applications may process data from an input stream. Each type of application may have an optimum configuration that may maximize the resources. For computationally intensive applications, optimized memory object locations and optimized process scheduling may make big differences in throughput. For applications that process data from an input stream, interrupt handling and device driver tuning may improve throughput.

In some embodiments, the execution environment 102 and/or the applications 140 may be written in a functional language or using a functional language paradigms. Some functional languages may have the capability of updating executable code during execution. One such language is Erlang.

A functional programming paradigm may have a notion of independent functions or processes. A functional process may consume inputs and produce outputs but may not change the state of other memory objects. In some embodiments, the processes may be rigidly defined as functional processes. Such embodiments may include functional programming languages, such as Erlang, Scala, F#, Lisp, Clojure, OCaml, Haskell, and others. In some cases, the processes may be written in a functional programming style where the programmer may adhere to a functional style even though a language, compiler, or other constraint may not enforce the functional style.

Imperative programming paradigms are those that define computation in terms of statements that change a program state. Examples of imperative programming languages include FORTRAN, BASIC, COBAL, as well as object oriented languages such as C, C++, C#, Perl, Python, PHP, Java, Ruby, and others. Imperative programming languages may perform message passing explicitly through library functions or other commands that pass explicit messages from one process to another. Imperative programming languages may also create implied messages using locks on memory objects or other resources. Other communications between processes may also be treated as messages.

In some embodiments, the dynamic configuration manager 136 may input configuration parameters to a compiler 138, which may change the manner in which the application 140 may be processed. In such embodiments, the application 140 may be recompiled or compiled with a specific set of parameters that may be more optimal than a set of default parameters.

A just in time compiler 139 may be an element of an execution environment 102 that compiles code at runtime. In many such embodiments, a programmer may compile the application code 140 into intermediate code, which is compiled again using a just in time compiler 139 at runtime. The just in time compiler 139 may create a machine-specific version of the executable code, perform runtime linking, or other functions.

The dynamic configuration manager 136 may provide input to the just in time compiler 139 to cause the runtime executable to change in some manners. For example, certain routines may be compiled using different compiler techniques or settings.

Figure 2:
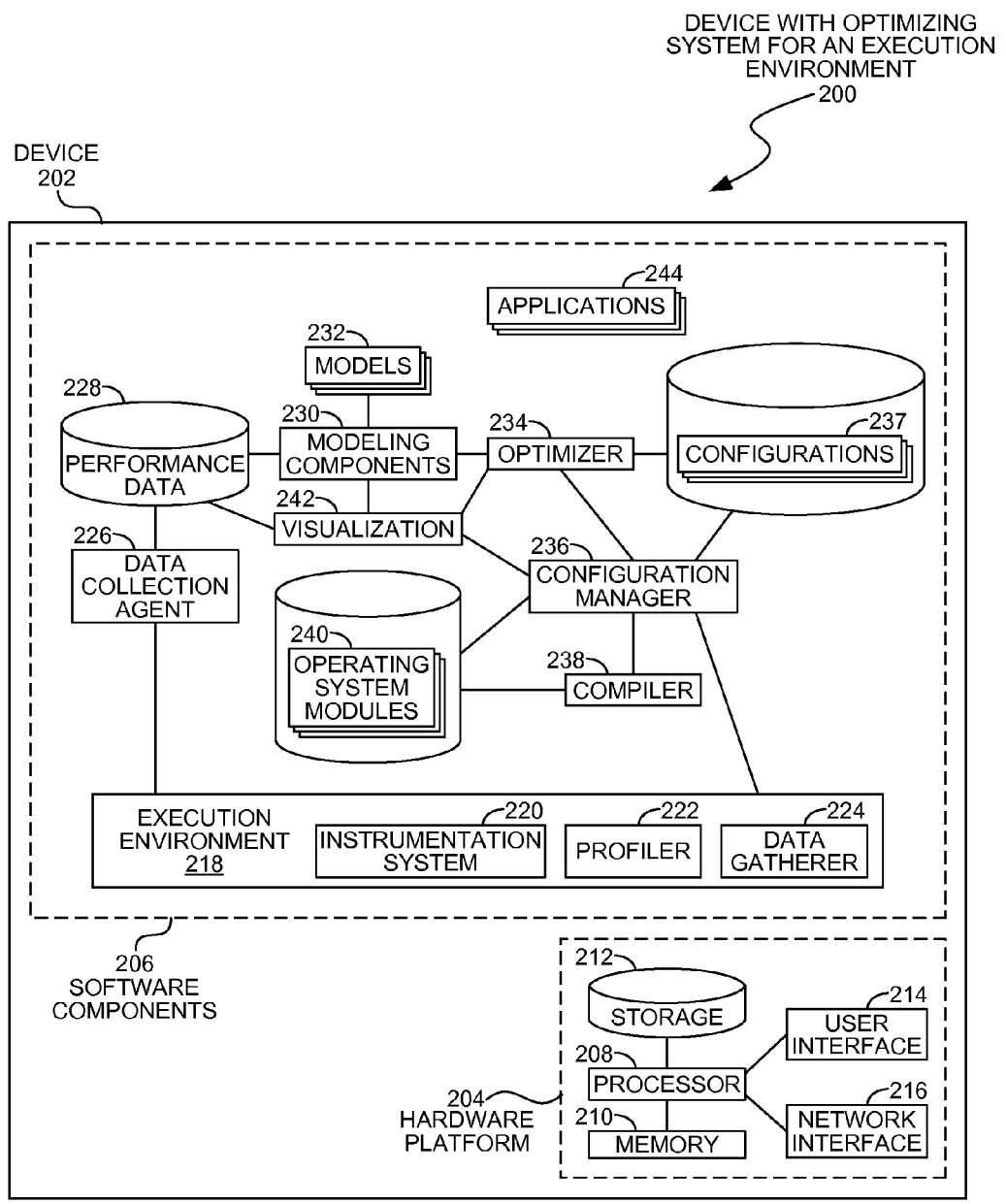
FIG. 2 is a diagram illustration of an embodiment showing a device with an optimizing system for an execution environment.

FIG. 2 is a diagram of an embodiment 200 showing a computer system with a system for optimizing an execution environment. The execution environment may collect data describing its performance and create an optimized set of settings for the execution environment, then cause those changes to be implemented.

The diagram of FIG. 2 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a device 202 that may have a hardware platform 204 and various software components. The device 202 as illustrated represents a conventional computing device, although other embodiments may have different configurations, architectures, or components.

In many embodiments, the device 202 may be a server computer. In some embodiments, the device 202 may still also be a desktop computer, laptop computer, netbook computer, tablet or slate computer, wireless handset, cellular telephone, game console or any other type of computing device.

The hardware platform 204 may include a processor 208, random access memory 210, and nonvolatile storage 212. The hardware platform 204 may also include a user interface 214 and network interface 216.

The random access memory 210 may be storage that contains data objects and executable code that can be quickly accessed by the processors 208. In many embodiments, the random access memory 210 may have a high-speed bus connecting the memory 210 to the processors 208.

The nonvolatile storage 212 may be storage that persists after the device 202 is shut down. The nonvolatile storage 212 may be any type of storage device, including hard disk, solid state memory devices, magnetic tape, optical storage, or other type of storage. The nonvolatile storage 212 may be read only or read/write capable. In some embodiments, the nonvolatile storage 212 may be cloud based, network storage, or other storage that may be accessed over a network connection.

The user interface 214 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 216 may be any type of connection to another computer. In many embodiments, the network interface 216 may be a wired Ethernet connection. Other embodiments may include wired or wireless connections over various communication protocols.

The software components 206 may include an execution environment 218 on which various applications 244 and services may operate. An execution environment may provide an abstraction layer between executing routines and the hardware components 204, and may include various routines and functions that communicate directly with various hardware components. In some embodiments, the execution environment 218 may be an operating system. In other embodiments, the execution environment 218 may be any type of virtual machine, including a process virtual machine.

The execution environment 218 may include an instrumentation system 220, a profiler 222, and a data gatherer 224. The execution environment 218 may also be parameterized such that a configuration manager 236 may cause the execution environment to have different functionality.

The instrumentation system 220 may be a set of functions that are incorporated into the execution environment 218 and may generate or retrieve operational and performance data. A profiler 222 may monitor execution environment operations to measure or detect operational or performance data. A data gatherer 224 may collect data from various sources and transmit the data to a data collection agent 226.

The data collection agent 226 may collect and prepare data for storage as performance data 228. In some cases, the data collection agent 226 may prepare the data by aggregating, sampling, summarizing, or other operations. Such operations may be performed prior to storage, in which case the raw data may be discarded. In some cases, the raw data and summarized data may both be stored as performance data 228.

A set of modeling components 230 may generate, train, and test various mathematical models of the execution environment performance. Once the models are created, an optimizer 234 may determine a set of optimized parameters.

A configuration manager 236 may update the configuration of the execution environment 218. The configuration manager 236 may change the execution environment 218 by changing algorithms used by the execution environment and by changing parameters used by various algorithms. The configuration manager 236 may store various configurations 237 that may be implemented in different circumstances.

Changes to algorithms used by the execution environment 218 may involve replacing one set of executable code with another. In such cases, the configuration manager 236 may deploy a new module or executable component in the execution environment 218. The new module may be from a library of execution environment modules 240 that may be pre-compiled, or may be compiled using a compiler 238.

The configuration manager 236 may create customized executable modules by making changes to an execution environment module 240 and compiling the module using the compiler 238. Once the new modules are created, the configuration manager 236 may add the new modules to the execution environment 218. When a new module replaces an older module, the older module may be decommissioned and removed from the execution environment. In some cases, the configuration manager 236 may merely remove modules to create an optimized configuration.

A visualization component 242 may be a user interface through which the data collected from the execution environment 218 may be visualized, as well as a user interface through which a user may make changes. Such changes may include identifying variables, heuristics, or other algorithms used by the modeling components 230, optimizer 234, configuration manager 236, or other elements.

Figure 3:
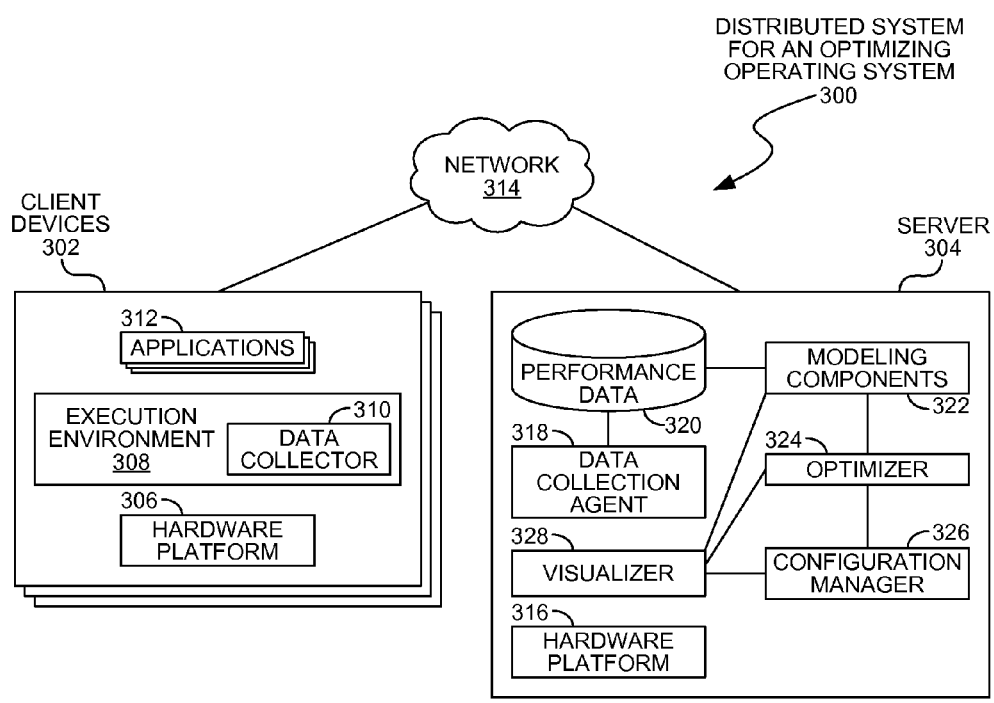
FIG. 3 is a diagram illustration of an embodiment showing a distributed system for optimizing an execution environment.

FIG. 3 is a diagram of an embodiment 300 showing a computer system with an optimizing execution environment as may be deployed in a network environment. A client device may collect data describing its performance, and a server computer may analyze the data to create an optimized set of settings for the execution environment, then cause those changes to be implemented back on the client device.

The diagram of FIG. 3 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 300 illustrates one architecture where data may be collected on client devices 302 and processed on a server device 304. The server device 304 may perform many of the functions of optimizing the execution environments on the various client devices. The architecture of embodiment 300 allows the client devices to maximize productivity by executing their workloads, and offloads the data analysis and optimization functions to a server computer 304.

The server computer 304 may analyze data from many different client devices 302. In some cases, each device may have customizations or optimizations that may be applied to each device individually, while in other cases, a group of devices may be analyzed and optimized with the same configuration settings. When many devices are optimized as a group, the data used for modeling may come from many devices to create a single model that may be applied to many devices. In some cases, embodiment 300 may represent many devices 302 where each device has a separate mathematical model and separate optimized settings.

The architecture of embodiment 300 may be deployed in several different settings. In a datacenter management deployment, the various devices 302 may be devices executing workloads within the datacenter and the server 304 may be a device within the datacenter that optimizes the performance of the devices 302. In such an embodiment, the devices 302 may be similarly configured, both from a hardware and software standpoint. In some datacenter deployments, the server 304 may create and manage separate models for each device 302.

In an Internet deployment, each device 302 may communicate with a server 304 that may analyze data from many different devices 302. The devices 302 may or may not have common hardware and software configurations. The server 304 may maintain separate models for each type of device or for devices having separate configurations. In some cases, the server 304 may collect data from many different devices yet may maintain a single mathematical model that may be applied to all of the various devices.

The architecture of embodiment 300 is merely one example of how the operations and components of embodiments 100 and 200 may be distributed in a network environment. The architecture of embodiment 300 illustrates one server that performs all of the modeling, optimization, and configuration management functions. Other embodiments may allocate some of the operations to the client devices 302, or may deploy additional servers to perform some subset of the operations described for the server 304.

The client devices 302 may have a hardware platform 306 and an execution environment 308. Each execution environment 308 may have a data collector 310 that may monitor the functions of the execution environment 308 and various applications 312. The data collector 310 may communicate over a network 314 to a server 304.

The client devices 302 may be physical devices or virtualized devices. A physical device may be a server computer, desktop computer, mobile handset, or other device on which an execution environment such as an operating system may run. A virtualized device may be a virtualized computer system that may operate on a hypervisor on a server computer. Such virtualized computer systems are often deployed in datacenters to manage large numbers of computing platforms.

The server 304 may also have a hardware platform 316 and execution environment 317 on which the various software components may operate.

The server 304 may have a data collection agent 318 that may collect and prepare data for storage as performance data 320. The data collection agent 318 may stage the data, perform aggregation and sampling, and select features that may be used for modeling.

Modeling components 322 may train one or more mathematical model representing the performance data 320 and validate the models. An optimizer 324 may analyze the models to identify optimized configurations for the client devices 302. A configuration manager 326 may deploy the optimized configurations. A visualizer 328 may be a user interface for displaying data as well as interfacing with various components for modeling, optimizing, and configuring the client devices 302.

Figure 4:
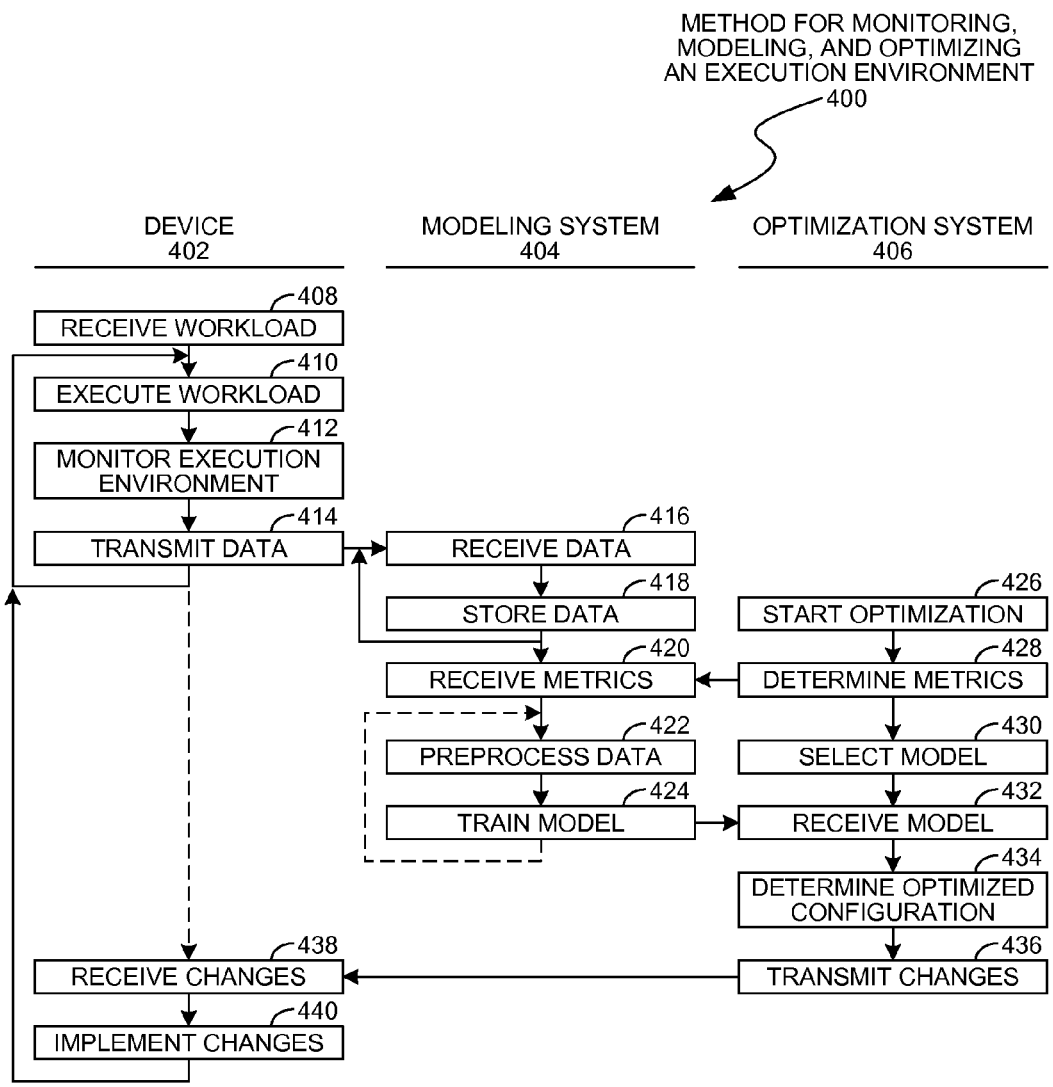
FIG. 4 is a flowchart illustration of an embodiment showing a method for monitoring, modeling, and optimizing an execution environment.

FIG. 4 is a flowchart illustration of an embodiment 400 showing a method for monitoring, modeling, and optimizing an execution environment. Embodiment 400 illustrates one method that may be performed by systems like embodiments 100, 200, or 300 to manage execution environments.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 illustrates one method for managing an execution environment, such as a virtual machine or operating system. The operations of the device 402 are illustrated in the left hand column, the operations of a modeling system 404 are illustrated in the center column, and the operations of an optimization system 406 are illustrated in the right hand column.

The device 402 may collect and transmit data, then receive and implement changes to the execution environment. The modeling system 404 may collect and store the data, as well as create and train models that may represent the functions of the device 402. The optimization system 406 may use the model to determine optimized settings for the device 402.

The device 402 may receive a workload in block 408. The workload may be a single application, multiple applications, or any other executable code that may be run in the execution environment. The workload may be executed in block 410.

During execution, the device 402 may monitor the execution environment in block 412 to collect various performance data. The data may be transmitted in block 414 to the modeling system 404. The monitoring process may loop back to block 410 to collect additional data. In some cases, the monitoring process may loop continually to collect data.

The modeling system 404 may receive the data in block 416 and store the data in block 418. When data are collected continually, the process may loop back to block 416.

The optimization system 406 may be started in block 426. A set of optimization metrics may be selected in block 428. The optimization metrics may include a set of parameters, heurstics, or other definitions that define the optimization goals for the execution environment. For example, the optimization goals may be performance related, such as high throughput, low latency, faster response time, or the like. In some cases, the optimization goals may be decreased energy usage, consistent utilization of resources, or other goals. In some cases, the goals may be complex algorithms or heuristics that incorporate several different elements.

The metrics may be used in block 420 by the modeling system 404 to create a model of the device 402. The data may be preprocessed in block 422 by aggregating, sampling, or other techniques, then used to train the model in block 424. In some embodiments, the preprocessing and training operations may loop to train over a large data set or to train the model continuously.

The model may be received by the optimization system 406 in block 432 and used to determine an optimized configuration in block 434. The changes to the execution environment may be transmitted in block 436.

The device 402 may receive changes to the execution environment in block 438 and may implement the changes in block 440. The device 402 may return to executing the workload in block 410.

Figure 5:
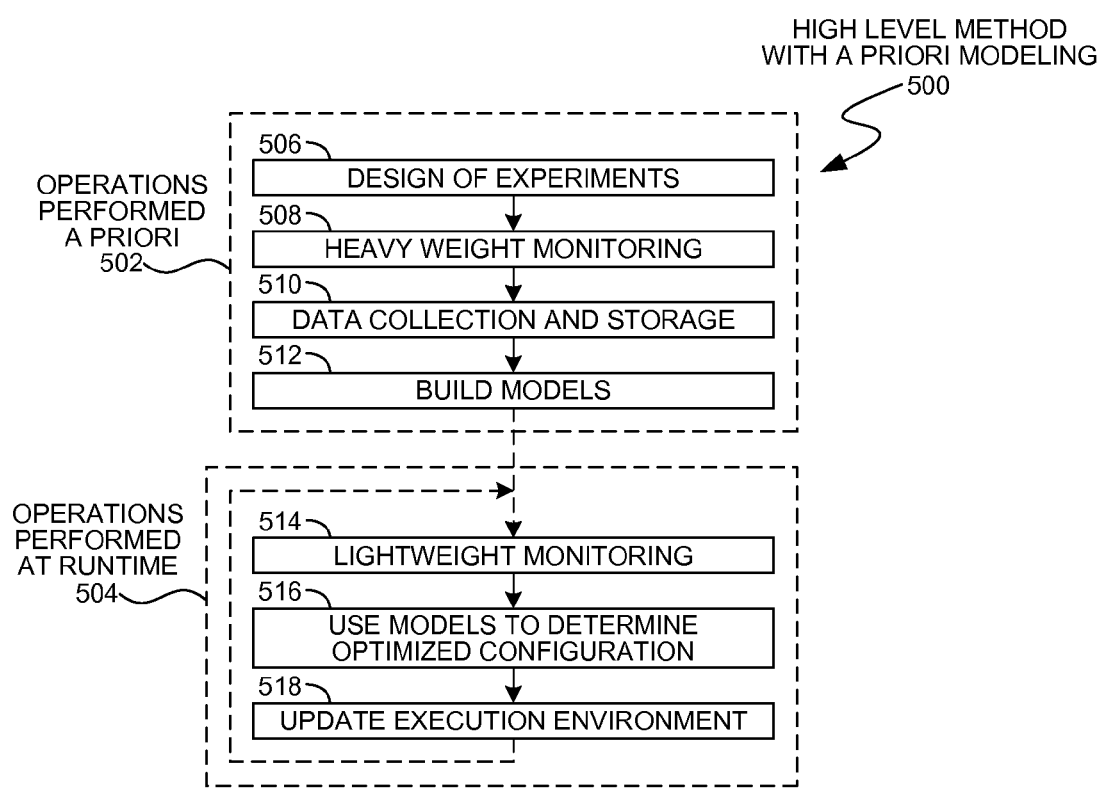
FIG. 5 is a flowchart illustration of an embodiment showing a high level method for optimizing with a priori modeling.

FIG. 5 is a flowchart illustration of an embodiment 500 showing a method for managing an execution environment using modeling analyses that are performed prior to execution. Embodiment 500 illustrates one method that may be performed by systems like embodiments 100, 200, or 300 to manage execution environments. Embodiment 500 illustrates a method that may develop models in a laboratory or testing environment, then deploy the models in a production environment.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 500 illustrates a method for managing execution environments where a set of models may be built prior to executing an execution environment. The modeling may be performed using a heavyweight monitoring system that may collect large amounts of data but may impair the operations of an execution environment. Such modeling may be performed in a laboratory setting with a comprehensive exercise of the execution environment.

The runtime operations may use a lightweight monitoring system that may indicate how the device is performing, then use the preexisting models to determine optimized configurations and deploy the updated configurations.

A set of operations 502 may be performed a priori to running a production system. In some cases, the operations 502 may be performed in a laboratory setting. In other cases, the operations 502 may be performed during an initial data collection phase in a production setting.

The operations 502 may collect data and create models of an execution environment. The operations 502 may be a comprehensive enough so that the models may reflect a large percentage of the situations that may be encountered by an execution environment, and so that the models may not change appreciably when additional data are added. In such situations, the models may be mature enough that the models may be used without a feedback loop to further improve the models.

The operations 504 performed in a production environment may perform a lightweight data collection mechanism that may not burden the system as much as the heavyweight data collection performed in the operations 502.

The preproduction or data collection and modeling phase of operations 502 may begin with a design of experiments in block 506. The design of experiments may create a wide range of exercises that may be performed by the execution environment. During those exercises, a heavyweight monitoring system in block 508 may collect a large amount of data, which may be collected and stored in block 510.

The data may be analyzed to build models in block 512. During the model building of block 512, some parameters that may be collected may be identified as key parameters that may influence the models, while other parameters may be identified as less important parameters.

The models constructed in block 512 may be a large set of models, some of which may be directed at optimizing some metrics while other models may be directed at optimizing other metrics. In some cases, the models may be analyzed by a data mining expert to select the various modeling methods, parameters for the models, and other items.

The runtime operations 504 may have a lightweight monitoring in block 514. In some cases, the heavyweight monitoring of block 508 may include monitoring of parameters that may be determined to be unimportant, and those parameters may be excluded in the lightweight monitoring of block 514. In some cases, the optimization model being applied to the devices in the operations 502 may use a subset of parameters monitored in the heavyweight monitoring of block 508, and the subset of parameters may be the only parameters monitored in block 514.

While monitoring the device in block 514, a model may be used to determine an optimized configuration in block 516. The optimized configuration may be used to update the execution environment in block 518 and the process may loop back to block 514.

Figure 6:
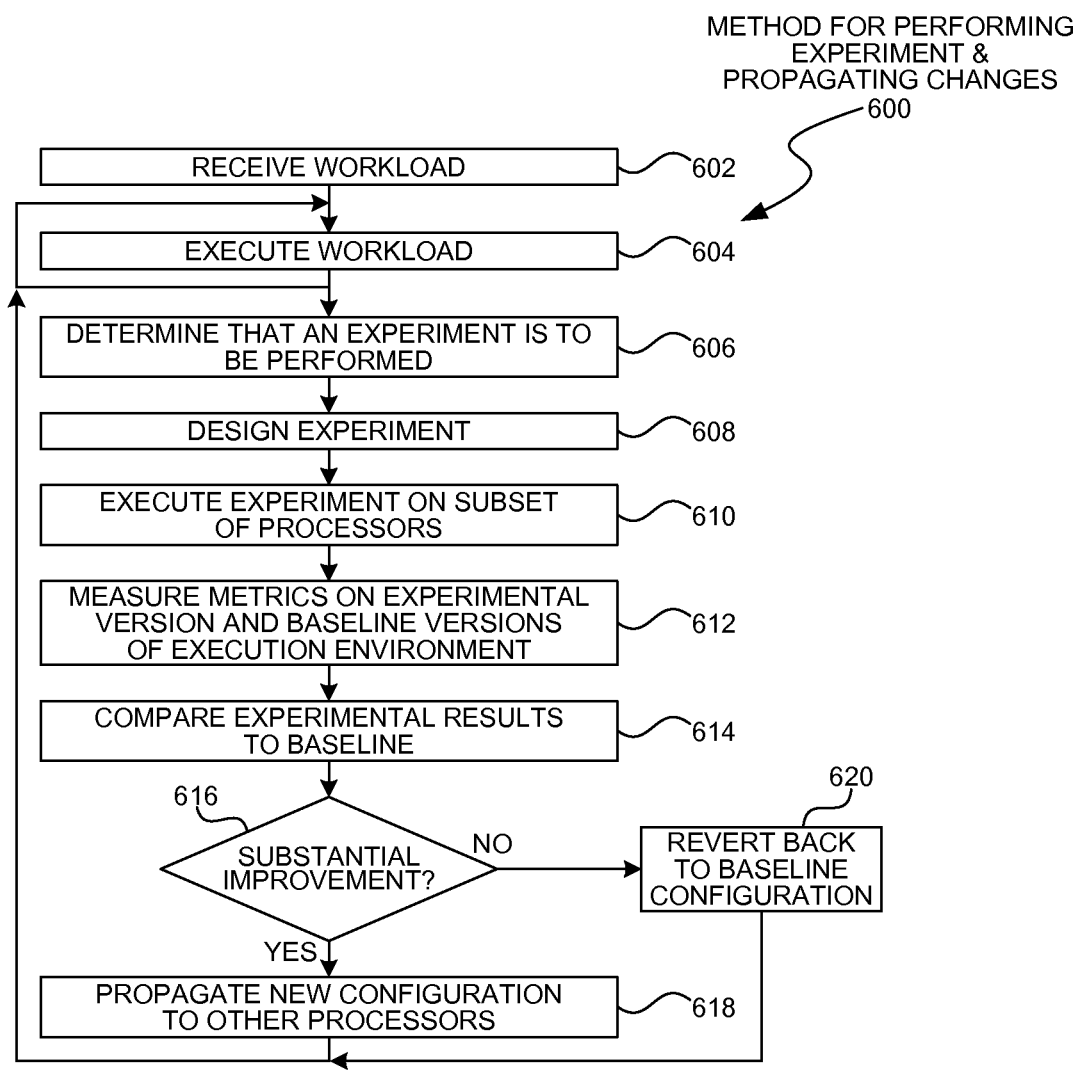
FIG. 6 is a flowchart illustration of an embodiment showing a method for performing an experiment and propagating changes.

FIG. 6 is a flowchart illustration of an embodiment 600 showing a method for performing an experiment on a subset of processors and propagating the results to other cores.

Embodiment 600 illustrates one method that may be used in a multicore or manycore system to tune the system over time.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 600 illustrates one method by which a system may tune itself. One or more of the processors on a device may have a change made to its code and the results may be measured against another baseline processor. When the changes improve the performance, the changes may be propagated to other processors.

Embodiment 600 may be a mechanism to tune an execution environment when the execution environment operates on many processors. In a manycore computer system, there may be 32, 64, or more processors in a single system. By taking one, two, or a small subset of the processors and testing a different configuration, various experiments may be made while the system is operational without adversely affecting the overall performance of the system. In some cases, two, three, four, or more cores may be assigned to execute code with changed parameters, leaving a significant portion of the cores executing code with the original parameters. The cores executing the unchanged code may serve as baseline comparisons against any cores executing changed code.

In block 602, a workload may be received and may be executed in block 604. The execution may continue in block 604 while the rest of embodiment 600 is performed.

A determination may be made in block 606 that an experiment may be performed. Such a determination may be made in different manners based on the embodiment. In some embodiments, an analysis of a model of the executing system may indicate that the system may not be operating at peak performance. In such embodiments, an experiment may be performed when there is a significant difference between a current performance metric and a projected or estimated performance metric that may be derived from the model.

In some embodiments, an experiment may be executed at periodic intervals. For example, an experiment may be performed every hour, every day, or some other period.

Some embodiments may perform an experiment when a system has appeared to reach a steady state in its workload. For example, a system may determine that the current workload has become saturated, such as entering a condition where a workload has become limited by compute cycles, input/output capacity, or some other bounds. When the system has entered a steady state, an experiment may be performed to attempt to optimize the system performance at the steady state.

Experiments may be triggered when a change may be made to the environment, such as changes to hardware or software components. Hardware or software components that are added or removed may change the performance characteristics of a system, leading to different optimized settings.

Some embodiments may trigger a new experiment when inputs to a system may change. The inputs may be expected, such as changes due to time of day, day of week, seasonal changes, or other periodic changes. Other changes to inputs may be unexpected, such as a website that has an unexpected rise in requests or an inventory system that adds a new product line.

In some cases, experiments may be triggered by human intervention. A system administrator, business manager, or other person may recognize an external event or may wish to ensure that the system operates in an optimized fashion. Still other embodiments may monitor other events that may trigger experiments to be executed.

In block 608, the experiment may be designed. The design of an experiment may be simplistic, such as varying one variable by a predefined amount, or may be a complex analysis that may vary several variables simultaneously. In some cases, an experiment may consist of a single test, while other experiments may have several tests that may change multiple variables with each test.

When a model of the system may be available, the model may predict that certain changes to the execution environment may yield improved results. In such embodiments, the model may be used to generate a single test or a group of tests.

The experiment may be executed on a subset of the processors in block 610. A single test may be performed on one or more processors at a time. In some cases, the same test may be performed on a single processor. When multiple tests may be performed, some or all of the tests may be performed simultaneously by changing the code executing on different processors at the same time.

During the execution of a test, metrics may be measured in block 612 on the experimental code as well as a baseline version of the code executing on another processor. In some cases, the experimental code and a baseline code may be instrumented or profiled to measure a performance metric or set of metrics.

The results of the experiment may be compared to the baseline in block 614. If a substantial improvement may be made in block 616, the new configuration may be propagated to other processors in block 618. If a substantial improvement is not realized, the processor used for the experiment may be reverted to the baseline configuration in block 620.

Figure 7:
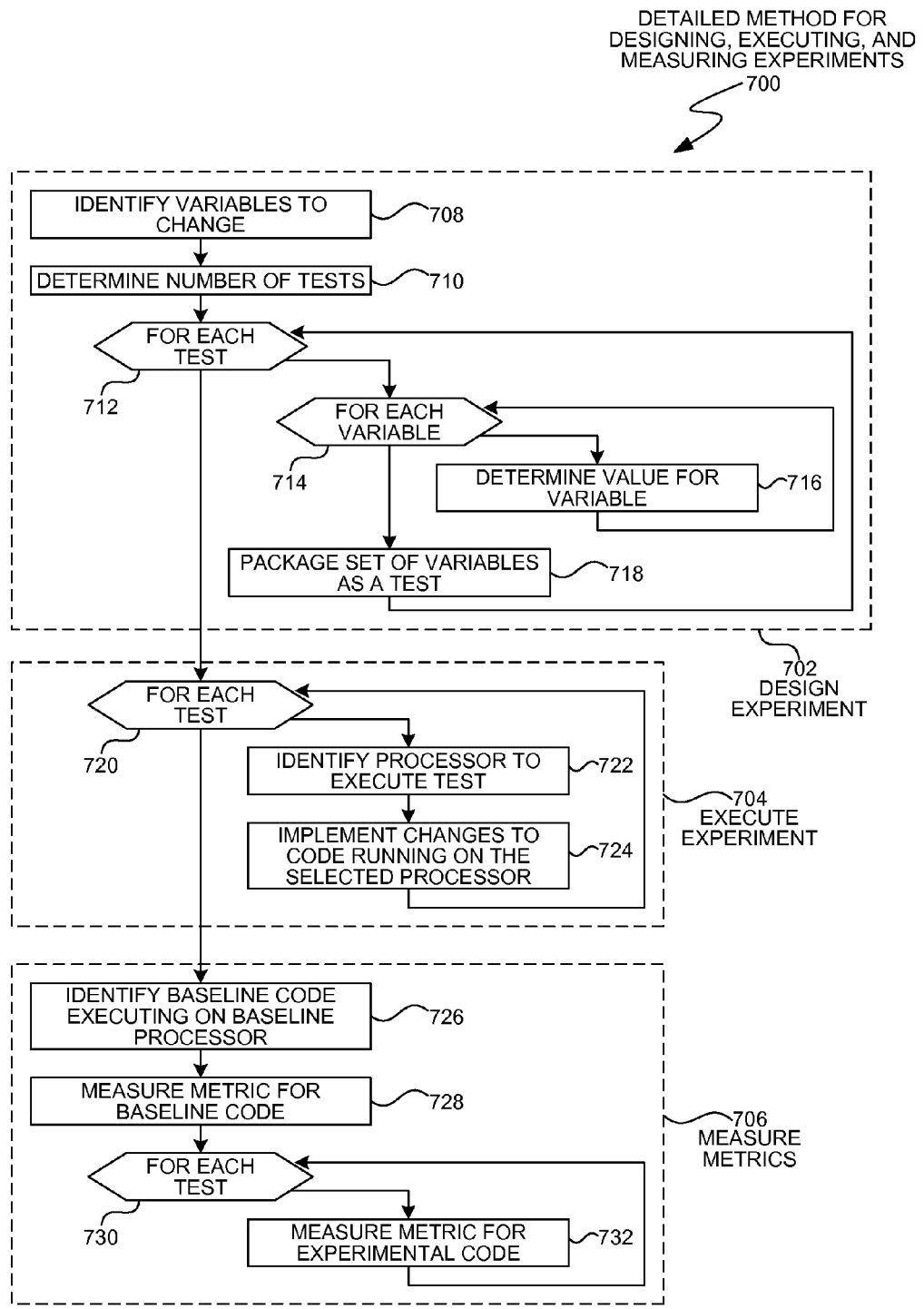
FIG. 7 is a flowchart illustration of an embodiment showing a detailed method for designing, executing, and measuring experiments.

FIG. 7 is a flowchart illustration of an embodiment 700 showing a detailed method for performing and executing an experiment on a subset of processors in parallel. Embodiment 700 illustrates one method that may be used in a multicore or manycore system to tune the system over time.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 700 illustrates the steps of design experiment in block 702, executing the experiment in block 704, and measuring metrics in block 706. Blocks 702, 704, and 706 may correspond with blocks 608, 610, and 612 of embodiment 600.

The experimental design in block 702 may include identifying the variables to change in block 708 and determining a number of tests to run in block 710. For each test in block 712, and for each variable in block 714, a value for the variable may be determined in block 716. Once the values of each variable are determined, the set of variables may be packaged in block 718 as an experiment.

The tests may be executed in block 704. For each test in block 720, a process may be identified in block 722 to execute the test, and the test may be executed in block 724 by making the changes to code running on the selected processor.

The measuring operations may be performed in block 706. A baseline configuration of code may be executed in block 726 and a metric for the baseline measured in block 728. For each test in block 730, the same metric may be measured in block 732.

Figure 8:
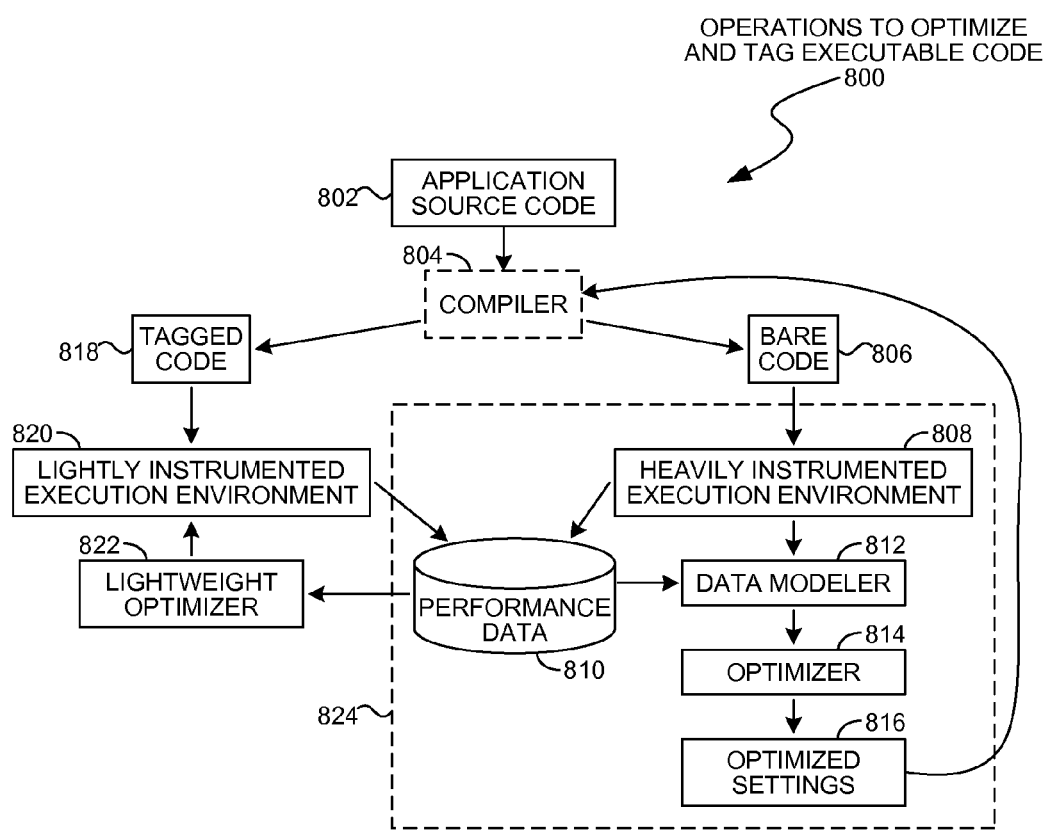
FIG. 8 is a diagram illustration of an embodiment showing operations to tag and execute code.

FIG. 8 is a diagram illustration of an embodiment 800 showing the flow of one embodiment that optimizes an application or workload. Embodiment 800 illustrates one mechanism and method by which optimized configuration settings may be determined and implemented.

Embodiment 800 illustrates a mechanism by which an application or other workload may be executed in a heavily instrumented environment, a set of optimized parameters may be generated, and the optimized settings implemented through a tagging mechanism.

Application source code 802 may be compiled using a compiler 804 to create bare code 806. The bare code 806 may be unoptimized code that may be executed in a heavily instrumented execution environment 808.

For the example of embodiment 800, compiled code is discussed. Other embodiments may use interpreted code. In some cases, the bare code 806 may be intermediate code, executable binary code, or source code in the case of an interpreted code.

The execution environment 808 may generate performance data 810 that may be used by a data modeler 812 and an optimizer 814 to generate optimized settings 816. In cases where mathematical models of the execution environments and various workloads exist, the execution environment 808 may generate enough data to characterize the workload so that an appropriate optimization model may be applied. In cases where a mathematical model may not exist, the execution environment 808 may generate sufficient observations so that a mathematical model may be constructed.

Some embodiments may create a set of process types that share the same characteristics. The process types may be further analyzed to determine optimized memory management and other settings for each process type. Once the process types are characterized and optimized, an optimizer 814 may classify processes into the appropriate type, then apply the optimized settings for that process type. Such an embodiment may not independently develop optimization settings for each process, but may apply predefined settings once the process has been classified.

The optimized settings 816 may be transmitted to the compiler 804 or otherwise fed back to the execution environment 820.

The optimized settings 816 may be in the form of tags, which may be any type of metadata, annotation, indication, or other information that may identify optimized settings. The optimized settings may be for any aspect of the executable environment, including memory management components such as garbage collection and memory allocation, process scheduling options and parameters, file system configuration options, interrupt handling options, and any other configurable settings. Some execution environments may have a superset or subset of such settings.

The tags may identify global settings that may apply to the entire workload, as well as settings that may be applied to specific processes, routines, functions, memory objects, or other portions of the workload. In many cases, memory management settings may be assigned to individual functions or processes so that each process may have an optimal set of configuration settings.

In such embodiments, one process may have one set of configuration settings while another process may have a different set of configuration settings. For example, one process may have memory allocation and garbage collection performed using one set of algorithms and settings, while another process may have a different set of algorithms and settings for memory allocation and garbage collection.

For example, the data modeler 812 may recognize and characterize a first process as being optimally executed with one set of settings, while another process may be optimally executed with another set of settings. Each process may be tagged with its own set of settings, which may be implemented when executed.

The tagged code 818 may be executed in a lightly instrumented execution environment 820. The execution environment 820 may be the same as the execution environment 808 in some cases. In other cases, the highly instrumented execution environment 808 may contain a more detailed data collection mechanism than the execution environment 820.

The tagged code 818 may have tags embedded into the executable code by the compiler 804. In such an embodiment, the execution environment 820 may recognize the tags and treat the executable code accordingly. For example, a process may be tagged with a specific set of memory allocation settings and garbage collection settings. When executing the process, the execution environment 820 may use the settings embedded in the tagged code 818.

In some cases, the executable environment 820 may gather performance information that may be fed back into the performance data 810. A lightweight optimizer 822 may also be used during runtime to further tune the execution environment 820 for the workload.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method performed by a computer processor, said method comprising:
   receiving a first executable code;
   monitoring said first executable code in a first execution environment, said first executable code having a plurality of processes;
   receiving a set of process classifications, each of said process classifications having a set of garbage collection settings;
   classifying each of said plurality of processes and assigning a process classification, each of said plurality of processes having a process classification;
   creating a tagged version of said first executable code comprising tags for each of said processes identifying said process classification; and
   executing said tagged version of said first executable code such that each process is executed using a set of garbage collection settings associated with said process classification.

2. The method of claim 1, said tagged version being executed in a second execution environment.

3. The method of claim 2, said first execution environment being an instrumented execution environment.

4. The method of claim 3, said second execution environment having less instrumentation than said first execution environment.

5. The method of claim 1, said executable code being compiled prior to executing.

6. The method of claim 5 further comprising:
   compiling said tagged version of said first executable code to produce tagged compiled code.

7. The method of claim 6, said tagged compiled code being executed in a second execution environment, said second execution environment:
   recognizing a first tag associated with a first process;
   determining that said first tag is associated with a first set of garbage collection settings; and
   executing said first process using said first set of garbage collection settings.

8. The method of claim 1, said tagged version of said first executable code comprising said first executable code and a metadata file, said metadata file comprising tags for each of said plurality of processes.

9. The method of claim 1, said set of garbage collection settings comprising defining a garbage collection method.

10. The method of claim 9, a first process being executed with a first garbage collection method and a second process being executed with a second garbage collection method.

11. The method of claim 10, said first process and said second process having identical source code.

12. The method of claim 1, said set of garbage collection settings comprising a condition to launch garbage collection.

13. The method of claim 1, said first execution environment being an interpreted execution environment.

14. A system comprising:
   a processor;
   an optimization system executing on said processor, said optimization system that:
      receives observations from executing a first executable code;
      determines a set of optimized memory management settings;
      generates metadata associating said optimized memory management settings for each of a plurality of processes executed with said first executable code;
      tags each process within said first executable code with a separate set of said optimized memory management settings; and
      causes said first executable code to be executed with said optimized memory management settings.

15. The system of claim 14, said separate set of said optimized memory management settings being stored in a metadata file.

16. The system of claim 15, said metadata file being consumed by a compiler to generate a second executable code.

17. The system of claim 15, said metadata file being consumed by an interpreter to execute said first executable code.

18. The system of claim 14, said optimized memory management settings comprising memory allocation settings.

19. The system of claim 14, said optimized memory management settings comprising garbage collection settings.

* * * * *